United States Patent
Neves

(10) Patent No.: US 11,630,907 B2
(45) Date of Patent: Apr. 18, 2023

(54) LIVE DATA VIEWING SECURITY

(71) Applicant: salesforce.com, inc., San Francisco, CA (US)

(72) Inventor: João Henrique Pimentel Wanderley Neves, Tampa, FL (US)

(73) Assignee: Salesforce, Inc., San Francisco, CA (US)

( * ) Notice: Subject to any disclaimer, the term of this patent is extended or adjusted under 35 U.S.C. 154(b) by 249 days.

(21) Appl. No.: 16/834,376

(22) Filed: Mar. 30, 2020

(65) Prior Publication Data

US 2021/0303717 A1    Sep. 30, 2021

(51) Int. Cl.
| | | |
|---|---|---|
| G06F 21/62 | (2013.01) | |
| G06F 3/01 | (2006.01) | |
| G06F 21/32 | (2013.01) | |
| G06F 21/60 | (2013.01) | |
| G06V 40/16 | (2022.01) | |

(52) U.S. Cl.
CPC ......... *G06F 21/6218* (2013.01); *G06F 3/013* (2013.01); *G06F 21/32* (2013.01); *G06F 21/604* (2013.01); *G06V 40/165* (2022.01); *G06V 40/172* (2022.01)

(58) Field of Classification Search
CPC .... G06F 21/6218; G06F 21/32; G06F 21/604; G06F 21/84; G06F 3/013; G06F 2221/2105; G06F 2221/2133; G06F 21/6245; G06V 40/165; G06V 40/172
See application file for complete search history.

(56) References Cited

U.S. PATENT DOCUMENTS

| | | | | |
|---|---|---|---|---|
| 9,449,217 B1* | 9/2016 | Bourlai | ............... | G06V 30/142 |
| 9,672,387 B2* | 6/2017 | Thörn | ...................... | G06F 21/32 |
| 2010/0205667 A1* | 8/2010 | Anderson | ............... | G06F 21/62 |
| | | | | 726/19 |
| 2013/0135198 A1* | 5/2013 | Hodge | ............... | H04N 21/4436 |
| | | | | 345/156 |
| 2014/0201844 A1* | 7/2014 | Buck | ..................... | G06F 21/554 |
| | | | | 726/26 |
| 2018/0083978 A1* | 3/2018 | Pantazelos | ........... | G06V 40/172 |
| 2020/0159938 A1* | 5/2020 | Sun | ........................ | G06F 21/32 |

FOREIGN PATENT DOCUMENTS

WO    WO 2015/166299 A1    11/2015

OTHER PUBLICATIONS

International Search Report in related international Application No. PCT/US2021/013219, dated Apr. 26, 2021.

* cited by examiner

*Primary Examiner* — Han Yang
(74) *Attorney, Agent, or Firm* — Holland & Hart LLP

(57) ABSTRACT

The techniques utilize an authentication process to authenticate the user to view protected data and an image monitoring process to monitor the field of view of the image detection component. When a user requests access to the protected data, the authentication process is activated. After a user is authenticated, the data may be displayed and an image monitoring process is activated and may use the image detection component to monitor the field of view to determine whether the user is actively viewing the data or that an additional person is in the field of view. When either event is detected, the protected data is concealed at the display of the user device.

16 Claims, 10 Drawing Sheets

LIVE DATA VIEWING SECURITY

FIELD OF TECHNOLOGY

The present disclosure relates generally to database systems and data processing, and more specifically to live data viewing security.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, a cloud platform may support access to sensitive user or customer data. Private or sensitive data may be subject to privacy protection laws, which may require that users prevent disclosure of or access to such data. Viewing this data on a device, such as a laptop or mobile device, in a public setting may risk unintentional disclosure of data. More particularly, a user may be viewing some personal or secure data on a device, then the device may be accessed by another user after the device is left alone. In other cases, another person may "shoulder surf" to view the personal or sensitive data.

DETAILED DESCRIPTION

Figure 1:
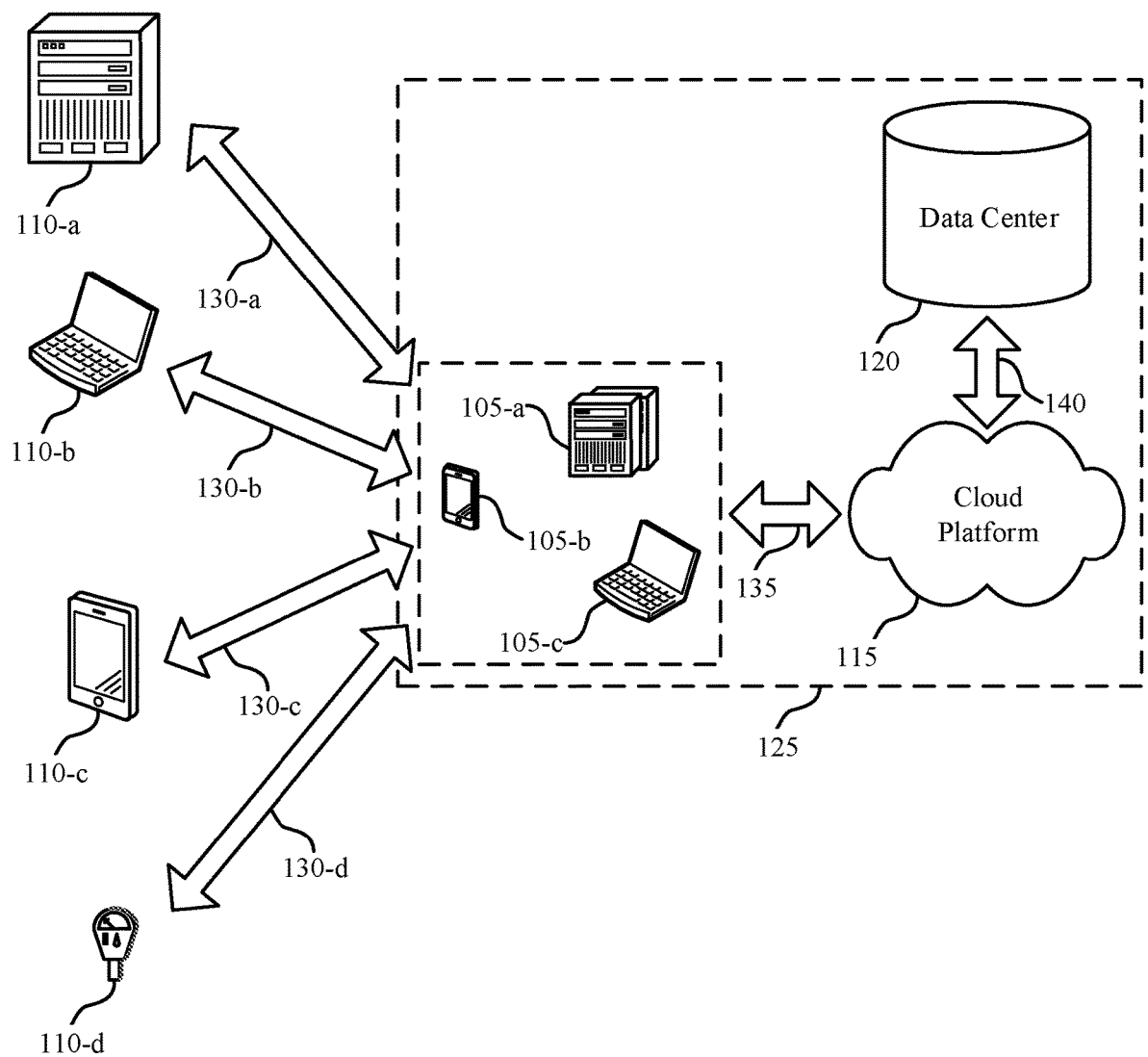
FIG. 1 illustrates an example of a system for securing data that supports live data viewing security in accordance with aspects of the present disclosure.

A user device, such as a mobile device or laptop, may be used to access various types of data. In some cases, a device may be used to access sensitive or secure data, such as personal identifying information, health data, financial data, etc. Such data may be subject to data protection laws, and accidental disclosure of the data may be harmful to the data's owner or an organization that supports access to the data. Disclosure of data is more common due to the mobility of computing devices, and use of these devices may result in unintended disclosure of data. For example, a user may be viewing some personal or secure data, then the device may be accessed by another user after the device is left alone. In other cases, another person may "shoulder surf" to view the personal or sensitive data.

The techniques described herein provide for the concealment of data at a device based on whether an authenticated user is actively viewing the data or whether another user is viewing the data. The techniques may leverage a device's image detection component (e.g., camera) to authenticate the user and to determine whether the user is actively viewing or to detect a "shoulder surfer." When an event indicating that the user is not viewing the protected data or that at least one other person is in a field of view of the image detection component is detected by the device, the device may activate a data concealment process such that the data may be hidden from view or unreadable. When the user looks back to the display or when the shoulder surfer leaves the field of the view, the device may redisplay or unhide the data.

The techniques utilize an authentication process to authenticate the user to view the data and an image monitoring process to monitor the field of view of the image detection component. When a user requests access to data that is sensitive, the authentication process is activated. The authentication process may determine whether the requesting user is authenticated to access the data. In some examples, the authentication process may determine whether the user is the "owner" of the device. Determination of an owner may involve accessing a secure enclave (e.g., a software or hardware based encryption or security key storage and management component) of a device. The device may determine whether a captured image of a face of the user requesting the access to the data matches a securely stored image of the owner of the device.

After a user is authenticated, the data may be displayed and an image monitoring process is activated. The image monitoring process may use the image detection component to monitor the field of view to determine whether the user is actively viewing the data. If the user's face leaves the field of view or if the user is looking away from the display, then the image monitoring process may detect an event that triggers concealment of the data. Further, if the image monitoring process detects that an additional person is in the field of view, then the process detects the event that triggers concealment of the data. When the user returns to view or the additional person leaves the view, as detected by the image monitoring process, then the device may redisplay the data or reactivate the authentication process, based on the configured security level.

Aspects of the disclosure are initially described in the context of an environment supporting an on-demand database service. Aspects are further described with respect to an environment illustrating live data viewing security, a computing system that supports live data viewing security, and a process flow diagram. Aspects of the disclosure are further illustrated by and described with reference to apparatus diagrams, system diagrams, and flowcharts that relate to live data viewing security.

FIG. 1 illustrates an example of a system 100 for cloud computing that supports live data viewing security in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support access to sensitive user or customer data, or other types of protected data. For example, cloud clients 105 may be organizations that support access (e.g., using an application) to data of contacts 110, which may be examples of customers, users, etc. Viewing this data on a device, such as a laptop or mobile device, in a public setting may risk unintentional disclosure of data. More particularly, a user associated with a client 105 may be viewing some personal or secure data on a device, then the device may be accessed by another person after the device is left alone. In other cases, another person may shoulder surf to view the personal or sensitive data.

To prevent unintentional disclosure of data, techniques described herein may support concealment of data during a live data viewing session. Concealment may be triggered based on events indicating that a disclosure may occur. Such an event may include detecting that the user is not actively viewing the data or that another user is potentially viewing the data (e.g., shoulder surfing). The techniques include detecting that a user is requesting access to protected data at a user device (e.g., a device of a client 105), authenticating the user using an image detection component, displaying the data, monitoring the user using the image detection component, and concealing the data when a potential disclosure event is detected. The data may be redisplayed when the event is resolved (e.g., the user returns to actively viewing the data or the other person leaves the field of view of the image detection component). Accordingly, the techniques support a real-time or near-real time data reveal/conceal process that allows protected data to be accessed in a public setting while reducing the potential for an unintentional disclosure of the protected data.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example utilization of the system, a cloud client 105 may be an example of a health service provider, such as a home health equipment provider. A user, such as a sales manager, delivery person, etc., may have access to patient data on a mobile device such as a smart phone or laptop using an application or web interface. The user may request access to specific patient data using the mobile device. The device, application, or web-interface, supports the techniques described herein. Upon receiving the request for the patient data (e.g., protected data), the device may authenticate the user using the camera of the device and in accordance with an authentication process. The authentication process may verify that the requesting user is the "owner" of the device, or that the user is authenticated to use the device and/or access the data. When the user is authenticated, the patient data is displayed and the image monitoring process is activated. The image monitoring process actively monitors the live data feed of the camera of the device and determines when a concealing event is detected. Detection of a concealing event triggers concealment of the data (e.g., blurring the screen, blocking the data, sending an alert). A concealing event may be detected when the user looks away from the display or is no longer in the field of view of the camera. In another example, a concealing event may be detected when another user is detected as being within the field of view of the camera of the device.

Figure 2:
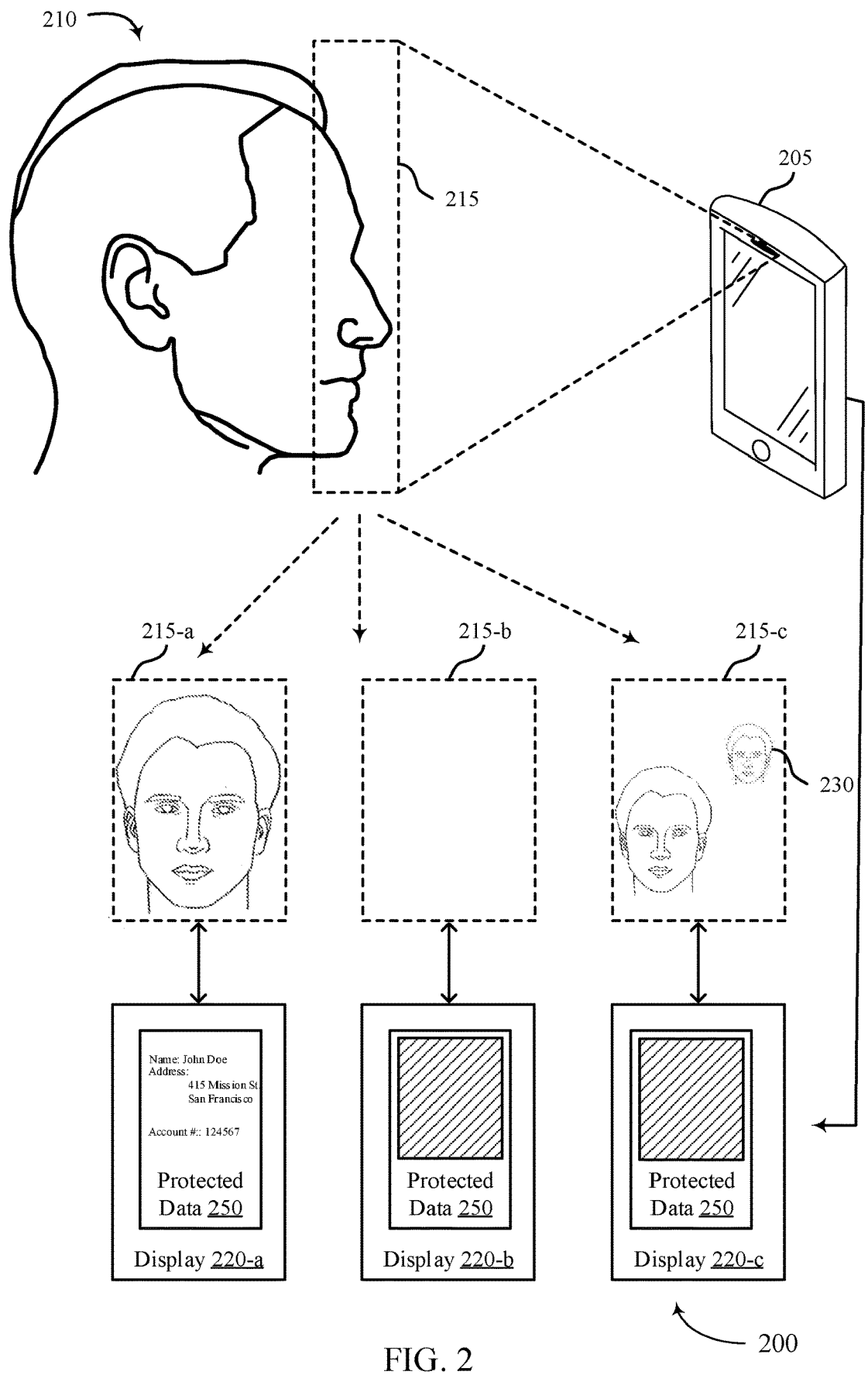
FIG. 2 illustrates an example of user device environment that illustrates live data viewing security in accordance with aspects of the present disclosure.

FIG. 2 illustrates an example of a user device environment 200 that illustrates live data viewing security in accordance with aspects of the present disclosure. The user device environment 200 includes a user device 205 and a user 210. The user device 205 may be an example of a device of a cloud client 105 of FIG. 1. In FIG. 2, the user device is a smart phone, but the implementations described herein are applicable to other devices such as laptop computers, desktop computers, tablets, etc. The user device 205 includes an image detection component that captures images of a field of view 215 of the image detection component. The image detection component may be an example of a camera and associated systems (e.g., image processing software and/or hardware).

The user 210 may request access to protected data 250 at the user device 205. In one example, the user uses mobile application or web interface associated with an employer of the user 210 to request access to the data. In another case, the user requests access to a private group or domain of a social media website or application. In any example, the data or information is "protected" in some sense. That is, access to the data may require that the user has designated access. Accordingly, the techniques described herein may be leveraged by various application types, such as web portals, social media applications/websites, organization applications, and the like. The implementations may be activated using a toggle or other user interface component. For example, a user may create a private group on a social media website/application, an organization specific website/application, etc. and toggle a switch to activate the data protection techniques. Accordingly, when members of the group access the group, the techniques described herein may be activated.

When the application or device detects that the user requests access to the protected data (e.g., a domain), an authentication process may be activated at the user device 205. The authentication process may use the image detection component to authenticate the user to access the data. As illustrated in field of view 215, the device 205 may determine that the user captured in the field of view 215 is the owner of the device or is authenticated to view the protected data. For example, the device may compare the image of the user's face in the field of view 215-a to a stored image of the user's face. The stored image of the user's face may be stored in some secure facility of the user device 205. In some cases, the authentication process may be supported by the operating system of the user device 205. For example, the authentication process may activate the native facial recognition authentication process of the device using an application programming interface (API) supported by the operating system of the device 205. Apple's Face ID system is an example facial recognition authentication system that may be used to authenticate the user 210. In another case, the authentication process may be a process specific to the application that supports access to the secure data. Thus, the authentication process may use facial recognition facilities to authenticate the user 210 to view the protected data 250.

Upon authentication of the user 210 in accordance with the authentication process, the protected data 250 may be displayed as demonstrated at display 220-a. The displays 220 represent the visual display of the device 205 (e.g., at a screen of the device 205). Further, an image monitoring process is activated upon authentication of the user 210. The image monitoring process may actively monitor the signal detected by the image monitoring component of the device 205. For example, the image monitoring process may process each frame or every number of frames captured by the image detection component to detect events that may indicate that the protected data 250 should be concealed. For example, the image monitoring process may generally monitor the field of view 215-b to determine whether anything has changed since the user 210 was authenticated. That is, the image monitoring process may determine that the user 210 is within the field of view. If that status (e.g., the user 210 is in the field of view) changes, then the image monitoring process may activate the concealment process which conceals the protected data 250 as illustrated at display 220-b and display 220-c.

As illustrated in field of view 215-b, the image monitoring process may determine that the user 210 is no longer viewing the data at the display because the user 210 is not within the field of view 215-b. This may be the result of the user leaving the device, rotating the device, blocking the camera lens, or some other condition. In response to detecting this event, the image monitoring process of the device 205 conceals the protected data 250 as illustrated in display 220-b.

As illustrated in field of view 215-c, the image monitoring process may determine that an additional person 230 is in the field of view 215-c. This may be an example of a shoulder surfer, or person that is looking at the device 205 without knowledge of the user 210. In response to detecting this event, the image monitoring process of the device 205 conceals the protected data 250 as illustrated in display 220-c.

Concealing the data may including generating a "blur" effect at the display, removing the data, blocking the data with a user interface component, alert, etc. In some examples, concealing the data may include generation of a visual and/or audio alert. While the data is concealed, the image monitoring process may continue to monitor the field of view 215. Thus, when the user returns to the field of view 215, the protected data 250 may be redisplayed as illustrated in display 220-a. However, in some cases, before the data is redisplayed, the authentication process may be reactivated, such that the user 210 is reauthenticated before the protected data 250 is redisplayed. This may be configured in accordance with the application and associated with the specific protected data 250. Reauthentication may be associated with a higher form of data protection than redisplaying the data in accordance with the image monitoring process. Thus, for a higher form of protection, reauthentication may be activated. In other cases, the data may be redisplayed by the image monitoring process. Further, the event causing the data to be concealed may be used to determined how the protected data 250 is re-accessed. For example, if the event triggering concealment is a shoulder surfer, as illustrated in field of view 215-c, then the user may be reauthenticated before the protected data 250 is displayed. However, when the event triggering concealment is the user not being within the field of view (e.g., the user rotates the device or leaves the device briefly), then the protected data 250 may be redisplayed upon the user returning to the field of view 215. Additionally or alternatively, whether the user is required to reauthenticate or not may depend on the length of time that the triggering event is active. As such, a timer may be activated when the triggering event occurs.

Figure 3:
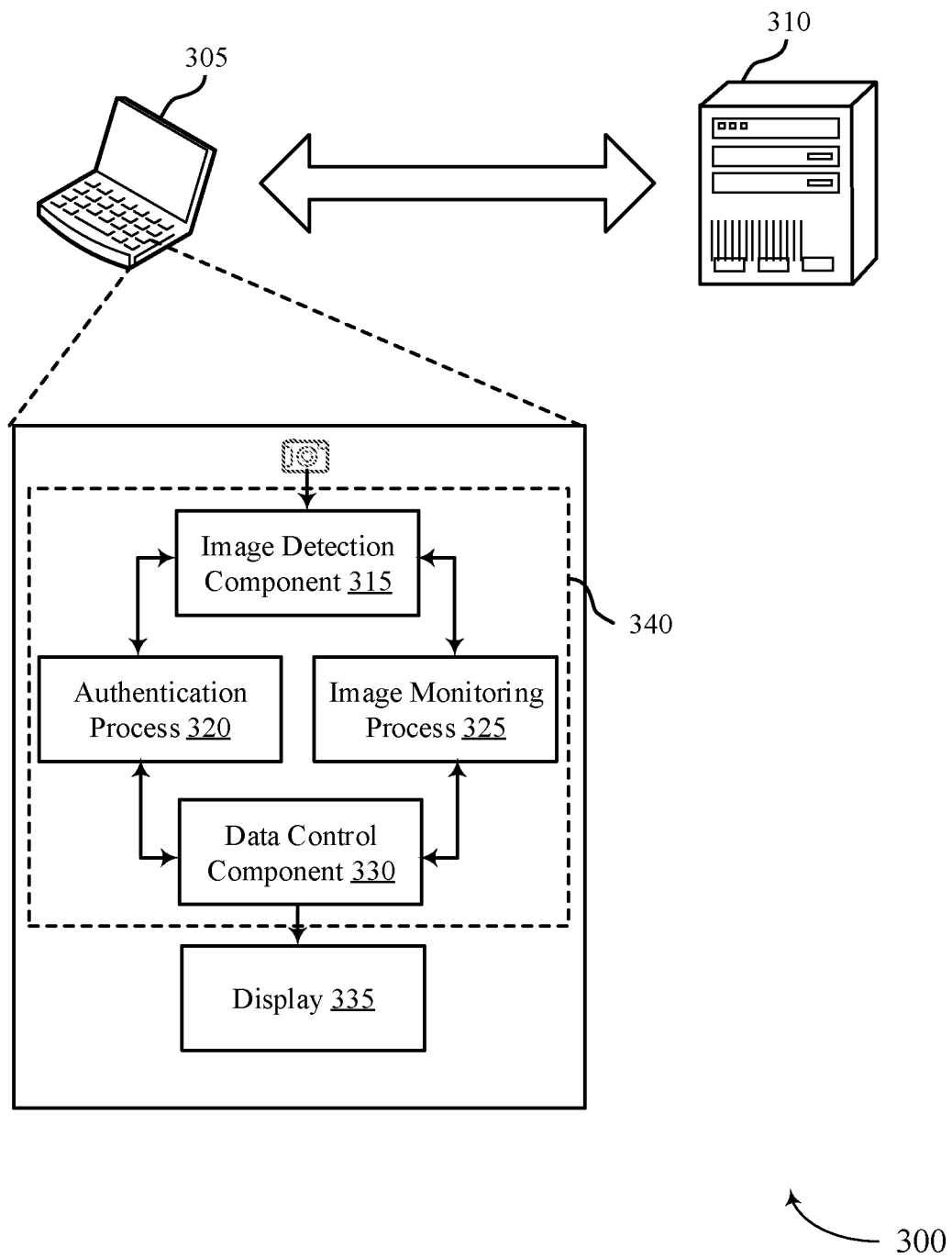
FIG. 3 illustrates an example of a computing system that supports live data viewing security in accordance with aspects of the present disclosure.

FIG. 3 illustrates an example of a computing system 300 that supports live data viewing security in accordance with aspects of the present disclosure. The computing system 300 includes a user device 305 and a server 310. The user device 305 may be an example of the user device 205 of FIG. 2 or a device of cloud client 105 of FIG. 1. The server 310 may be an example of aspects of the data center 120 of FIG. 1. The server 310 may support access to various data and facilities by the device 305. That is, the server 310 may support service of data to an application 340 executable on the device 305 and access to data processing by the application 340.

A user of the device 305 may request access to data that is designated as protected. The data may be designated by the user, the application 340, an organization, etc. The request may be transmitted to the server 310 for serving the requesting data. In some cases, the server responds with an authentication request at the device 305, or the application 340 triggers the authentication. In some examples, the protected data being accessed may be stored at the device 305, and the device 305 may initiate an authentication process 320 without interaction with the server 310. An authentication process 320 may be activated in response to detection of the request to access the protected data. The authentication process 320 may use an image detection component 315, which may include a lens, hardware, and/or software for capturing and processing image data. The authentication process 320 may determine whether the user is authenticated to access the protected data. In some examples, the authentication process determines whether the user is the owner of the device. Determining whether the user is an owner may include comparing a captured image of the user to an image stored in a secure storage of the device. Thus, the authentication process 320 may use facial recognition algorithms. The authentication process 320 may leverage the device's 305 native authentication system or an authentication application stored on the device 305. For example, the authentication process 320 may transmit an API request to the device's native authentication process. The native authentication process may respond to the request with an authentication acknowledgment or negative acknowledgement.

If the user is not authenticated in accordance with authentication process 320, then the user may not access the protected data. If the user is authenticated, then then protected data may be displayed at display 335 by data control component 330 and image monitoring process 325 may be activated. The image monitoring process 325 may monitor output by the image detection component 315 to identify events that may trigger concealment of the data at the display 335. The image monitoring process 325 may analyze each frame or image, or a number of images in a designated time period, to identify such events. The monitoring may include determining whether the state of the field of view has changed from the user being in the field of view. For example, the image monitoring process 325 may identify that the user has left the field of view or that another person is in the field of view. As such, when the field of view changes state, then the image monitoring process 325 may trigger concealment of the data by the data control component 330 at the display 335.

In some examples, the image monitoring process 325 executes a facial recognition process or algorithm, that may be different from the algorithm used by the authentication process 320. This may be due to security limitations configured for the device 305. In some examples, the facial recognition process or algorithm may be an algorithm native to the device 305 or supported by the device 305. That is, the image monitoring process 325 may transmit one or more API requests to a process supported by the device 305 to detect the events that trigger data concealment. The request may be for a location of the face and/or how many faces are in a particular frame/image. In one example, the API may transmit a response that indicates that the process is no longer detecting a face (e.g., face detection is negative), or that a face is approaching an edge of the frame. Thus, the data concealment may be triggered. Further, the algorithm may be configured to detect multiple faces, so that the algorithm/API may respond with an indication of detection of multiple faces. The data may be concealed accordingly. As the algorithm may be continuously or periodically fed frames captured by the image detection component 315, the algorithm may respond with the detection results continuously or periodically.

In one example, the image detection component 315 may capture a number of images per second (e.g., 60 images), and the request to the facial recognition algorithm may be transmitted for each image or for a set of the images. In some cases, the images are pre-processed such that the image may be processed by the facial recognition algorithm. Pre-processing may include resizing, compressing, etc. In some cases, the image monitoring process 325 may actively monitor eye or gaze direction to determine whether the user is actively viewing the data. As such, the image monitoring process 325 may leverage eye tracking features of a facial recognition algorithm to detect events that indicate that the user is not looking at the data/display 335. For example, if the algorithm detects that a user is looking away from the screen, while the user's face is still within the field of view, the data may be concealed until the user looks back at the screen/data. Eyes are an example of one facial feature that may be tracked to determine whether a user is viewing the data. Other features may be nose pointing direction, face direction, etc.

Thus, the authentication process 320 authenticates the user and the image monitoring process 325 is nearly immediately activated after authentication. Thus, while the image monitoring process 325 may not determine that actual authenticated user is the detected face, the delay is minimal and any "switching" of faces may be avoided. Further, in some examples, the image monitoring process 325 may detect that the detected face is the user/owner (e.g., that the detected face is authenticated).

Concealment of the data may include blurring the data, displaying an alert over the data, or otherwise blocking the data at the display 335. In some cases, the data is concealed until the event is resolved. For example, if the image monitoring process 325 detects that the user returns to the field of view or that the additional person has left the field of then, the data control component 330 may redisplay the protected data at the display 335. In other cases, after the event is detected and the data is concealed, then the user may need to be reauthenticated in accordance with the authentication process 320. Whether reauthentication is required or not may depend on the desired level of security, the settings of the application, etc.

Figure 4:
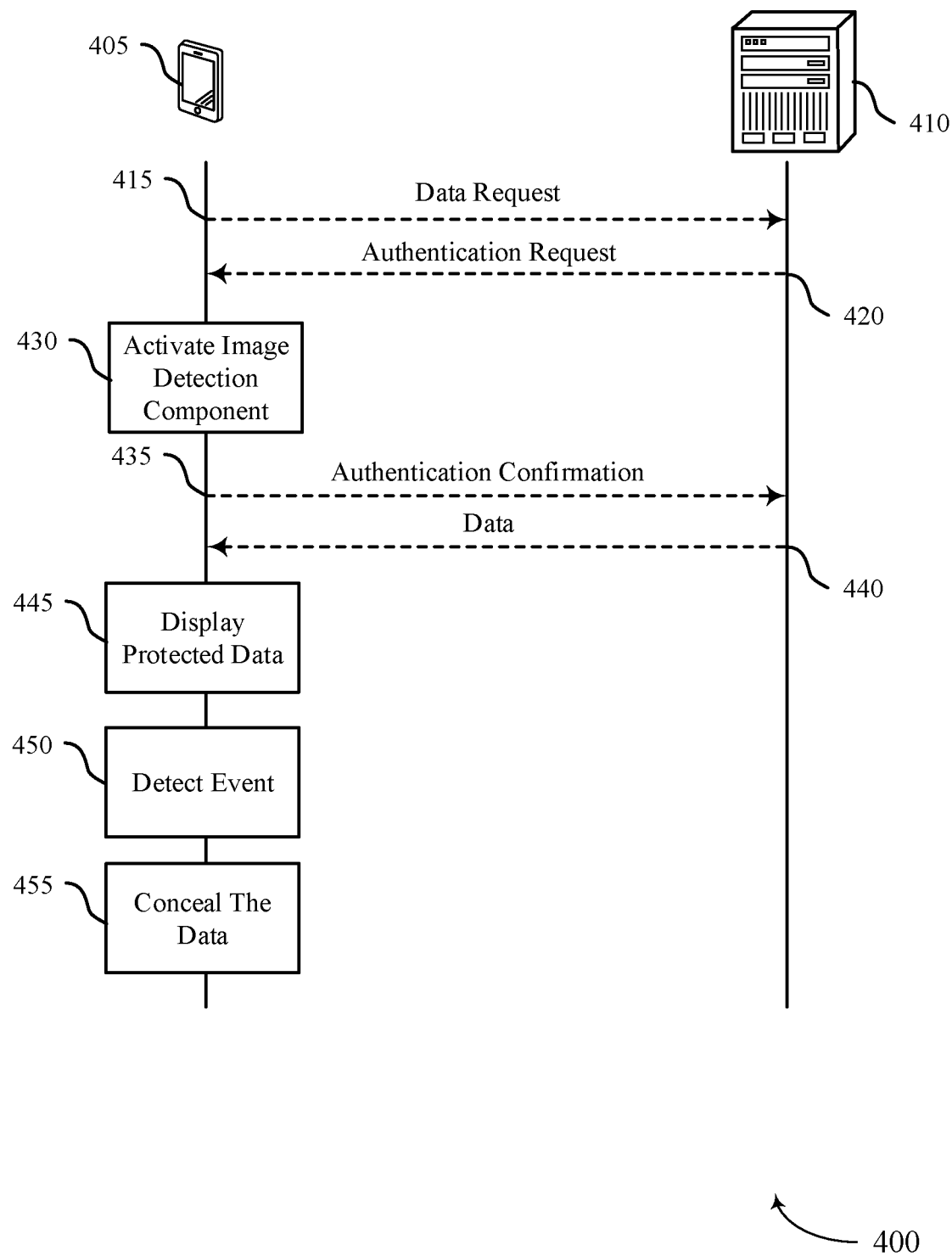
FIG. 4 illustrates an example of a process flow diagram that supports live data viewing security in accordance with aspects of the present disclosure.

FIG. 4 illustrates an example of a process flow diagram 400 that supports live data viewing security in accordance with aspects of the present disclosure. The process flow diagram 400 includes a user device 405 and a server 410, which may be examples of the corresponding devices of FIGS. 1 through 3. At 415, the user device 405 may transmit a data request to the server 410. The request may indicate a set of protected data (e.g., private user data, a secure domain, etc.). At 420, the server transmits an authentication request to the device 405 in response to receiving the data request for the protected data.

At 430, the user device 405 may activate an image detection component of the user device to authenticate a user to access protected data at the user device in accordance with an authentication process. In some examples, the image detection component is activated in response to the authentication request from the server 410. In some examples, the image detection component is activated by an application executing on the device 405, based on receiving a request to access protected data. That is, the device 405 may activate the image detection component without input from the server 410 and/or without transmitting the data request to the server 410.

At 435, the user device 405 transmits an authentication confirmation to the server 410 based on a result of the authentication process. In response, at 440, the server 410 may transmit the requested protected data to the device 405. In some examples, the server 410 transmits the data in response to the initial request 415, but the data is not viewable until the user is authenticated. In other cases, the data is stored at the device and is not viewable until the user is authenticated.

At 445, the user device 405 may display the protected data at a user interface of the user device based at least in part on a result of the authentication process. At 450, the user device may detect, based at least in part on an image monitoring process that executes an image detection model and uses the image detection component, an event indicating that the user is not viewing the protected data or that at least one other person is in a field of view of the image detection component. At 455, the user device 405 may conceal the protected data at the user interface based at least in part on detecting the event.

Figure 5:
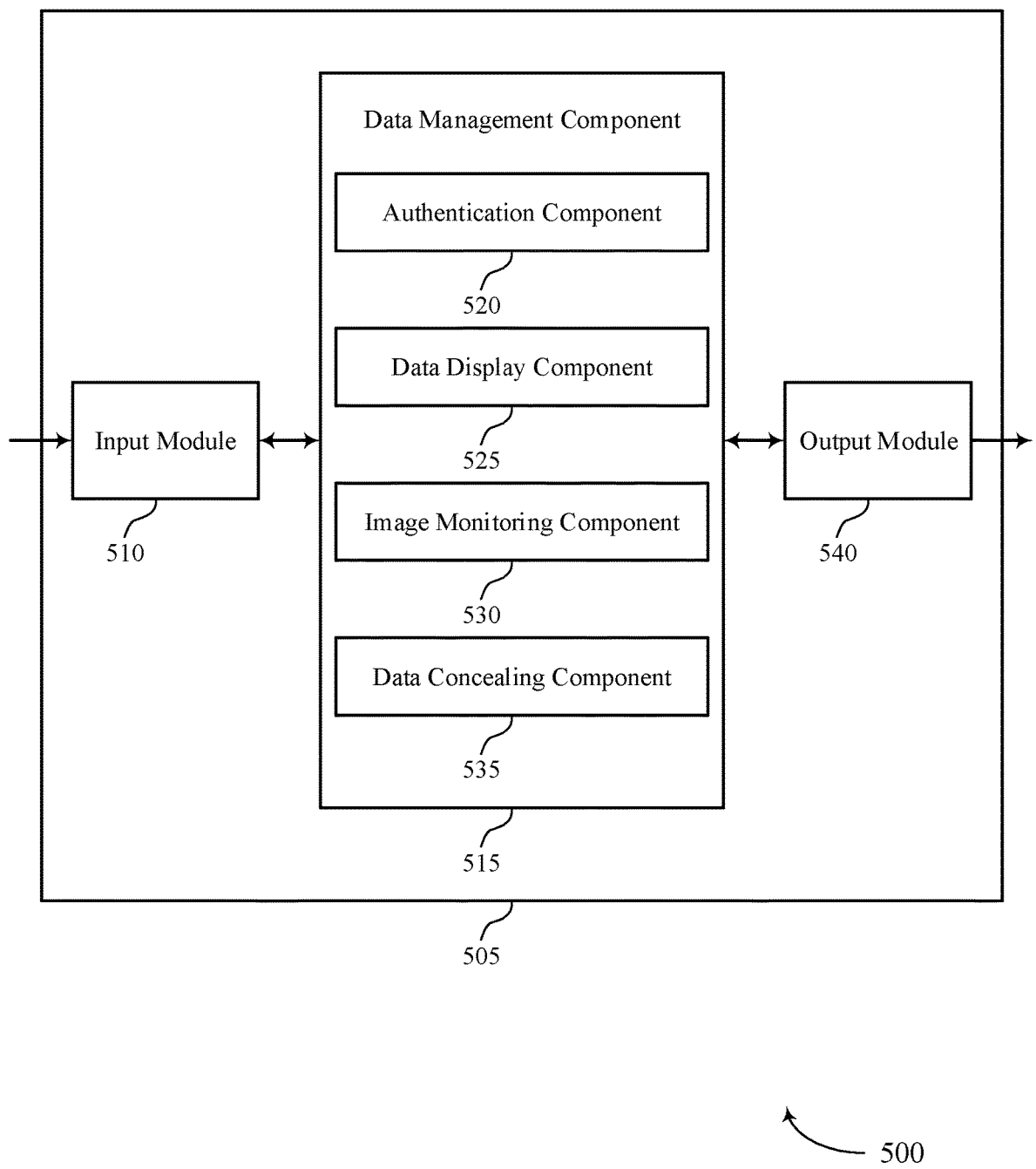
FIG. 5 shows a block diagram of an apparatus that supports live data viewing security in accordance with aspects of the present disclosure.

FIG. 5 shows a block diagram 500 of an apparatus 505 that supports live data viewing security in accordance with aspects of the present disclosure. The apparatus 505 may include an input module 510, a data management component 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the data management component 515 to support live data viewing security. In some cases, the input module 510 may be a component of an input/output (I/O) controller 715 as described with reference to FIG. 7.

The data management component 515 may include an authentication component 520, a data display component 525, an image monitoring component 530, and a data concealing component 535. The data management component 515 may be an example of aspects of the data management component 605 or 710 described with reference to FIGS. 6 and 7.

The data management component 515 and/or at least some of its various sub-components may be implemented in hardware, software executed by a processor, firmware, or any combination thereof. If implemented in software executed by a processor, the functions of the data management component 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data management component 515 and/or at least some of its various sub-components may be physically located at various positions, including being distributed such that portions of functions are implemented at different physical locations by one or more physical devices. In some examples, the data management component 515 and/or at least some of its various sub-components may be a separate and distinct component in accordance with various aspects of the present disclosure. In other examples, the data management component 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The authentication component 520 may activate an image detection component of the user device to authenticate a user to access protected data at the user device in accordance with an authentication process.

The data display component 525 may display the protected data at a user interface of the user device based on a result of the authentication process.

The image monitoring component 530 may detect, based on an image monitoring process that executes an image detection model and uses the image detection component, an event indicating that the user is not viewing the protected data or that at least one other person is in a field of view of the image detection component.

The data concealing component 535 may conceal the protected data at the user interface based on detecting the event.

The output module 540 may manage output signals for the apparatus 505. For example, the output module 540 may receive signals from other components of the apparatus 505, such as the data management component 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
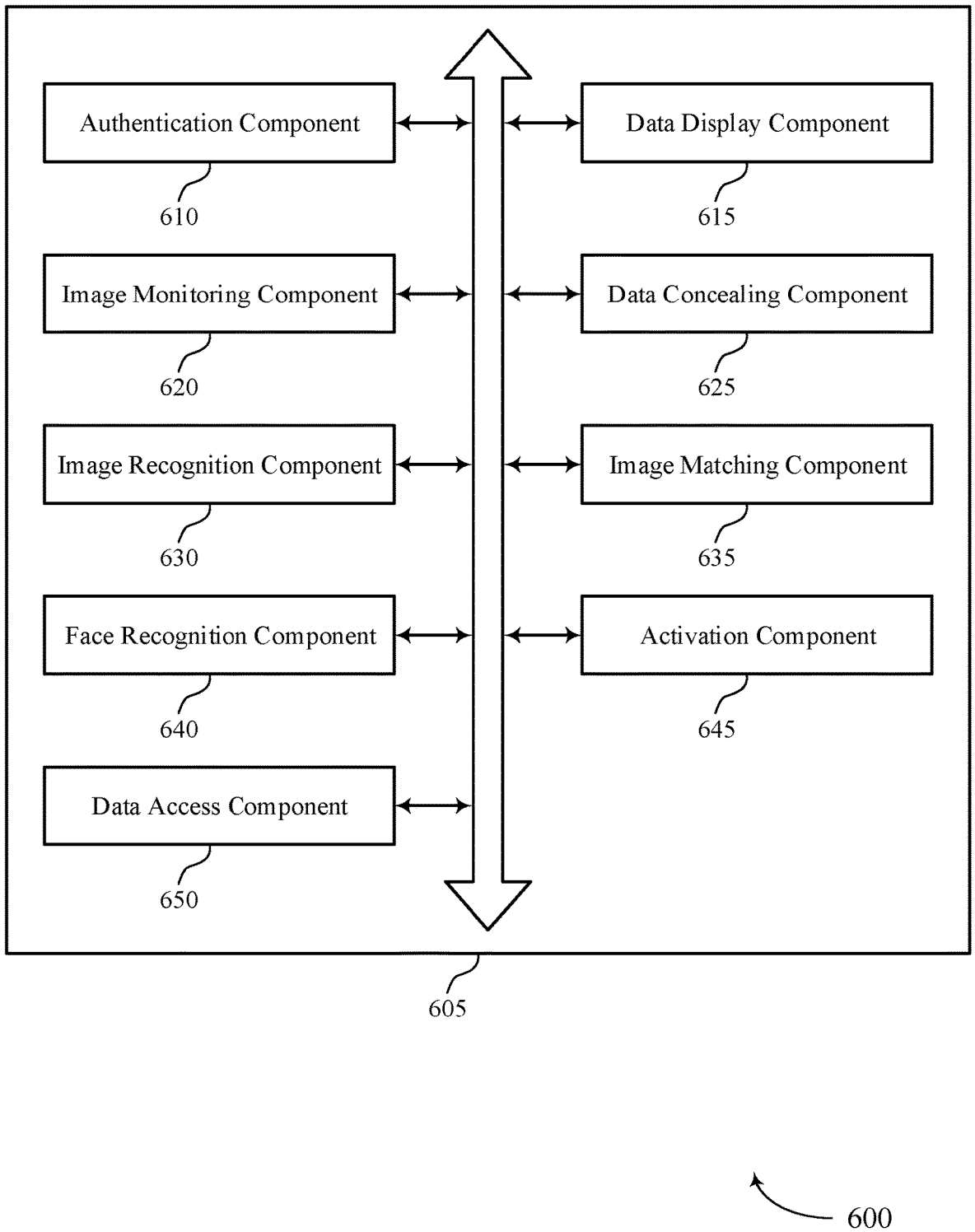
FIG. 6 shows a block diagram of a data management component that supports live data viewing security in accordance with aspects of the present disclosure.

FIG. 6 shows a block diagram 600 of a data management component 605 that supports live data viewing security in accordance with aspects of the present disclosure. The data management component 605 may be an example of aspects of a data management component 515 or a data management component 710 described herein. The data management component 605 may include an authentication component 610, a data display component 615, an image monitoring component 620, a data concealing component 625, an image recognition component 630, an image matching component 635, a face recognition component 640, an activation component 645, and a data access component 650. Each of these modules may communicate, directly or indirectly, with one another (e.g., via one or more buses).

The authentication component 610 may activate an image detection component of the user device to authenticate a user to access protected data at the user device in accordance with an authentication process.

In some examples, the authentication component 610 may determine that the user is an owner of the user device in accordance with the authentication process, where the user is authenticated to access the protected data based on determining that the user is the owner of the user device.

The data display component 615 may display the protected data at a user interface of the user device based on a result of the authentication process.

In some examples, the data display component 615 may redisplay the protected data based on detecting the second event.

The image monitoring component 620 may detect, based on an image monitoring process that executes an image detection model and uses the image detection component, an event indicating that the user is not viewing the protected data or that at least one other person is in a field of view of the image detection component.

In some examples, the image monitoring component 620 may monitor the user in the field of view in accordance with the image monitoring process, where the event is detected in accordance with the monitoring.

In some examples, the image monitoring component 620 may detect a second event indicating that the user is viewing the protected data or that the at least one other person is not in the field of view of the image detection component in accordance with the image monitoring process.

The data concealing component 625 may conceal the protected data at the user interface based on detecting the event.

In some examples, the data concealing component 625 may blur the protected data at the user interface, displaying an alert at the user interface, or a combination thereof.

The image recognition component 630 may identify a face in the field of view of the image detection component.

The image matching component 635 may match the face to an image of the owner of the user device stored in a secure enclave of the user device.

The face recognition component 640 may monitor one or more facial features that indicate whether the user is gazing at a display of the user device.

In some examples, the face recognition component 640 may determine that eyes of the user indicate that the user is looking away from the display of the user device, where the event is detected in accordance with the determining.

The activation component 645 may reactivate the authentication process based on detecting the event.

In some examples, the activation component 645 may activate the image monitoring process in response to authenticating the user in accordance with the authentication process.

The data access component 650 may detect that the user is requesting access to the protected data, where the authentication process is performed in response to detecting that the user is requesting the access.

Figure 7:
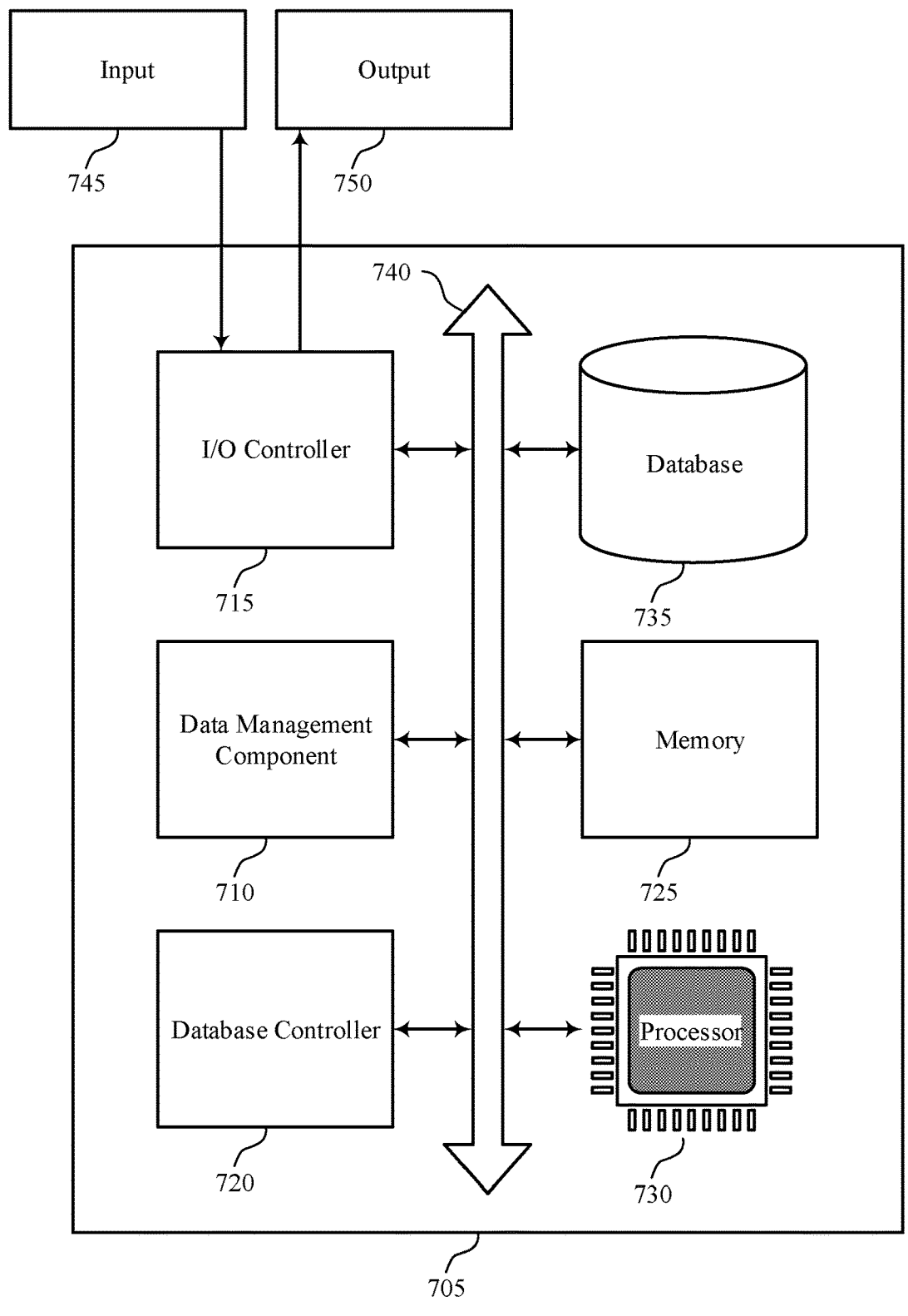
FIG. 7 shows a diagram of a system including a device that supports live data viewing security in accordance with aspects of the present disclosure.

FIG. 7 shows a diagram of a system 700 including a device 705 that supports live data viewing security in accordance with aspects of the present disclosure. The device 705 may be an example of or include the components of a user device or an apparatus 505 as described herein. The device 705 may include components for bi-directional data communications including components for transmitting and receiving communications, including a data management component 710, an I/O controller 715, a database controller 720, memory 725, a processor 730, and a database 735. These components may be in electronic communication via one or more buses (e.g., bus 740).

The data management component 710 may be an example of a data management component 515 or 605 as described herein. For example, the data management component 710 may perform any of the methods or processes described above with reference to FIGS. 5 and 6. In some cases, the data management component 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting live data viewing security).

Figure 8:
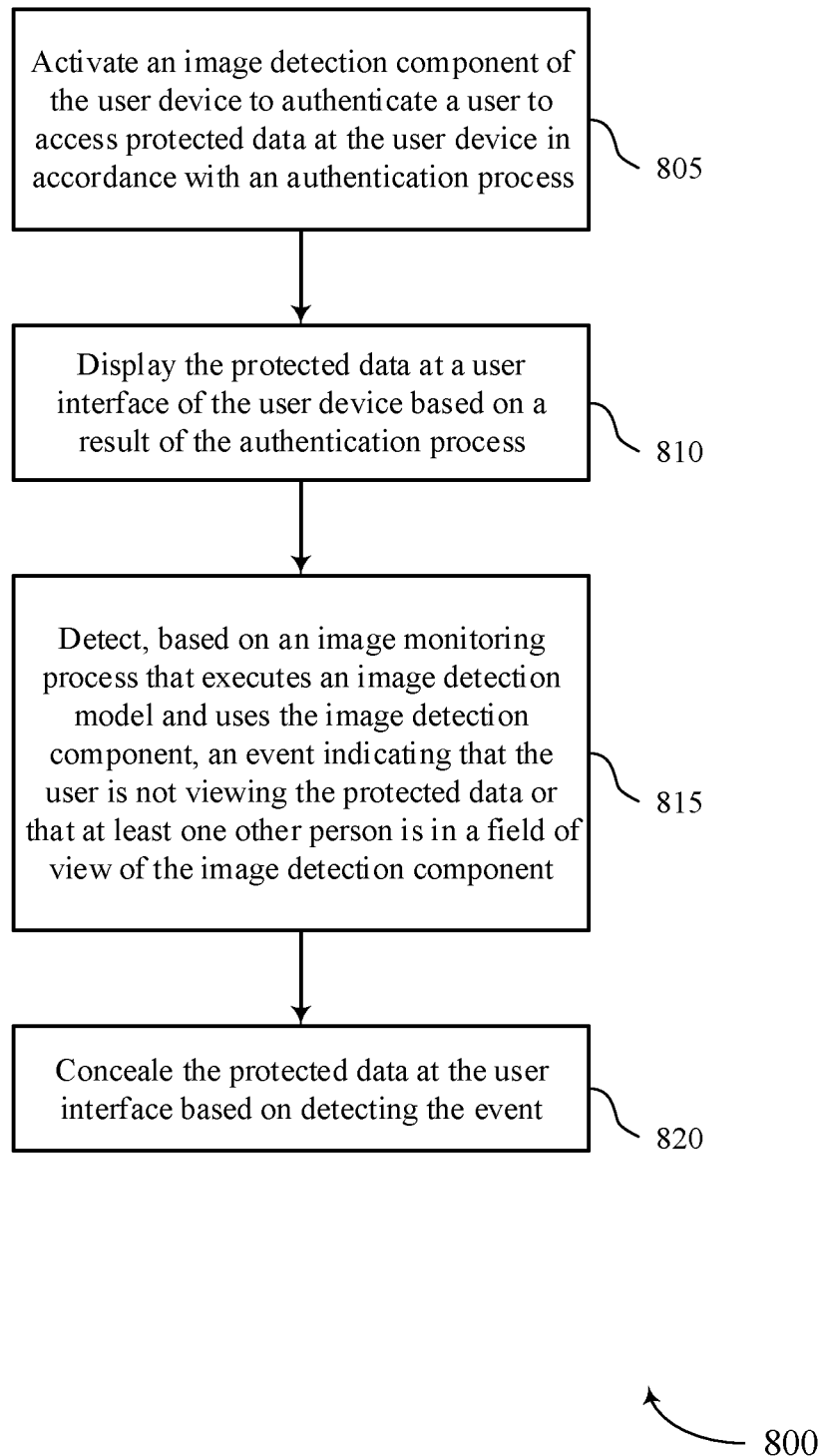
FIGS. 8 through 10 show flowcharts illustrating methods that support live data viewing security in accordance with aspects of the present disclosure.

FIG. 8 shows a flowchart illustrating a method 800 that supports live data viewing security in accordance with aspects of the present disclosure. The operations of method 800 may be implemented by a user device or its components as described herein. For example, the operations of method 800 may be performed by a data management component as described with reference to FIGS. 5 through 7. In some examples, a user device may execute a set of instructions to control the functional elements of the user device to perform the functions described below. Additionally or alternatively, a user device may perform aspects of the functions described below using special-purpose hardware.

At 805, the user device may activate an image detection component of the user device to authenticate a user to access protected data at the user device in accordance with an authentication process. The operations of 805 may be performed according to the methods described herein. In some examples, aspects of the operations of 805 may be performed by an authentication component as described with reference to FIGS. 5 through 7.

At 810, the user device may display the protected data at a user interface of the user device based on a result of the authentication process. The operations of 810 may be performed according to the methods described herein. In some examples, aspects of the operations of 810 may be performed by a data display component as described with reference to FIGS. 5 through 7.

At 815, the user device may detect, based on an image monitoring process that executes an image detection model and uses the image detection component, an event indicating that the user is not viewing the protected data or that at least one other person is in a field of view of the image detection component. The operations of 815 may be performed according to the methods described herein. In some examples, aspects of the operations of 815 may be performed by an image monitoring component as described with reference to FIGS. 5 through 7.

At 820, the user device may conceal the protected data at the user interface based on detecting the event. The operations of 820 may be performed according to the methods described herein. In some examples, aspects of the operations of 820 may be performed by a data concealing component as described with reference to FIGS. 5 through 7.

Figure 9:
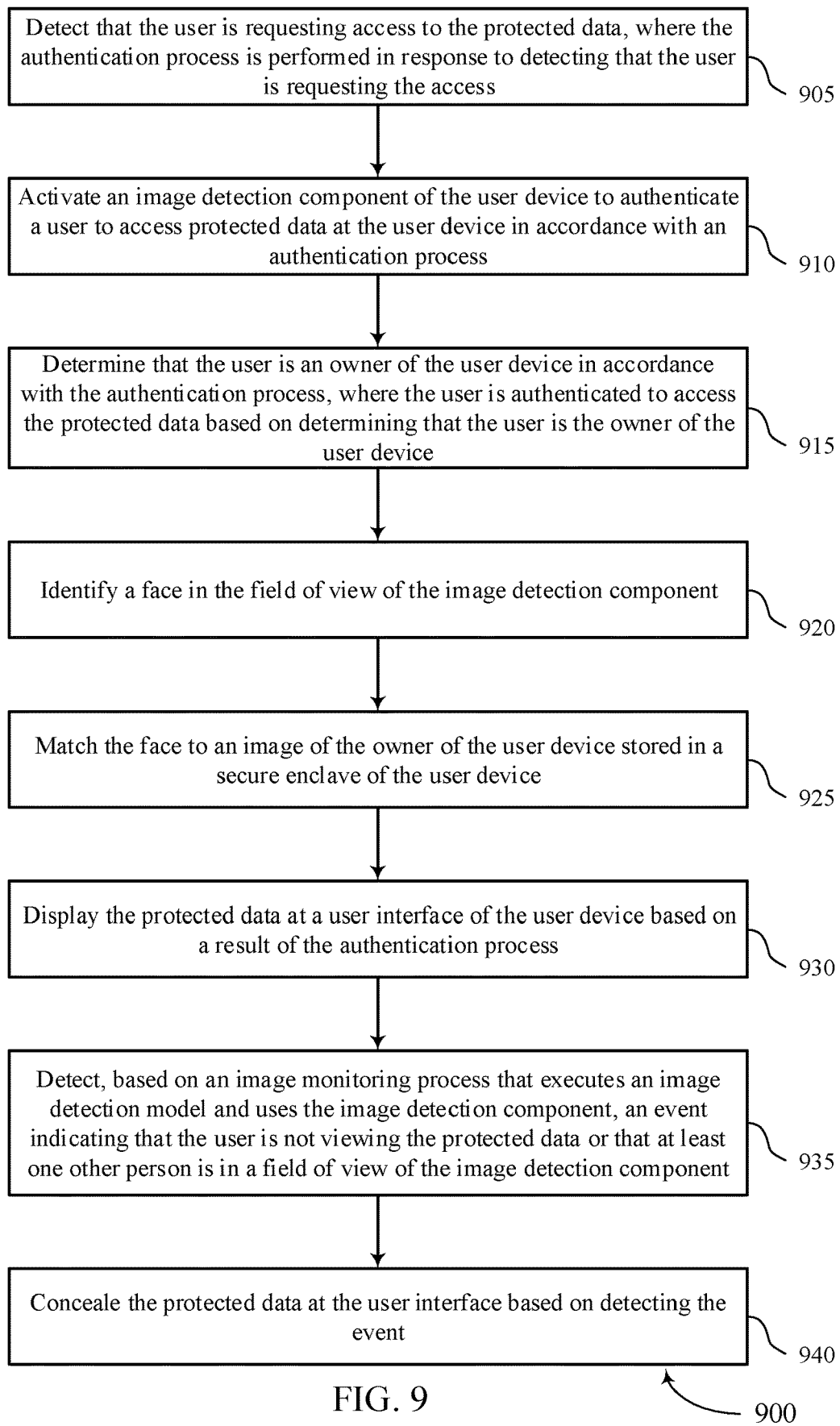

FIG. 9 shows a flowchart illustrating a method 900 that supports live data viewing security in accordance with aspects of the present disclosure. The operations of method 900 may be implemented by a user device or its components as described herein. For example, the operations of method 900 may be performed by a data management component as described with reference to FIGS. 5 through 7. In some examples, a user device may execute a set of instructions to control the functional elements of the user device to perform the functions described below. Additionally or alternatively, a user device may perform aspects of the functions described below using special-purpose hardware.

At 905, the user device may detect that the user is requesting access to the protected data, where the authentication process is performed in response to detecting that the user is requesting the access. The operations of 905 may be performed according to the methods described herein. In some examples, aspects of the operations of 905 may be performed by a data access component as described with reference to FIGS. 5 through 7.

At 910, the user device may activate an image detection component of the user device to authenticate a user to access protected data at the user device in accordance with an authentication process. The operations of 910 may be performed according to the methods described herein. In some examples, aspects of the operations of 910 may be performed by an authentication component as described with reference to FIGS. 5 through 7.

At 915, the user device may determine that the user is an owner of the user device in accordance with the authentication process, where the user is authenticated to access the protected data based on determining that the user is the owner of the user device. The operations of 915 may be performed according to the methods described herein. In some examples, aspects of the operations of 915 may be performed by an authentication component as described with reference to FIGS. 5 through 7.

At 920, the user device may identify a face in the field of view of the image detection component. The operations of 920 may be performed according to the methods described herein. In some examples, aspects of the operations of 920 may be performed by an image recognition component as described with reference to FIGS. 5 through 7.

At 925, the user device may match the face to an image of the owner of the user device stored in a secure enclave of the user device. The operations of 925 may be performed according to the methods described herein. In some examples, aspects of the operations of 925 may be performed by an image matching component as described with reference to FIGS. 5 through 7.

At 930, the user device may display the protected data at a user interface of the user device based on a result of the authentication process. The operations of 930 may be performed according to the methods described herein. In some examples, aspects of the operations of 930 may be performed by a data display component as described with reference to FIGS. 5 through 7.

At 935, the user device may detect, based on an image monitoring process that executes an image detection model and uses the image detection component, an event indicating that the user is not viewing the protected data or that at least one other person is in a field of view of the image detection component. The operations of 935 may be performed according to the methods described herein. In some examples, aspects of the operations of 935 may be performed by an image monitoring component as described with reference to FIGS. 5 through 7.

At 940, the user device may conceal the protected data at the user interface based on detecting the event. The operations of 940 may be performed according to the methods described herein. In some examples, aspects of the operations of 940 may be performed by a data concealing component as described with reference to FIGS. 5 through 7.

Figure 10:
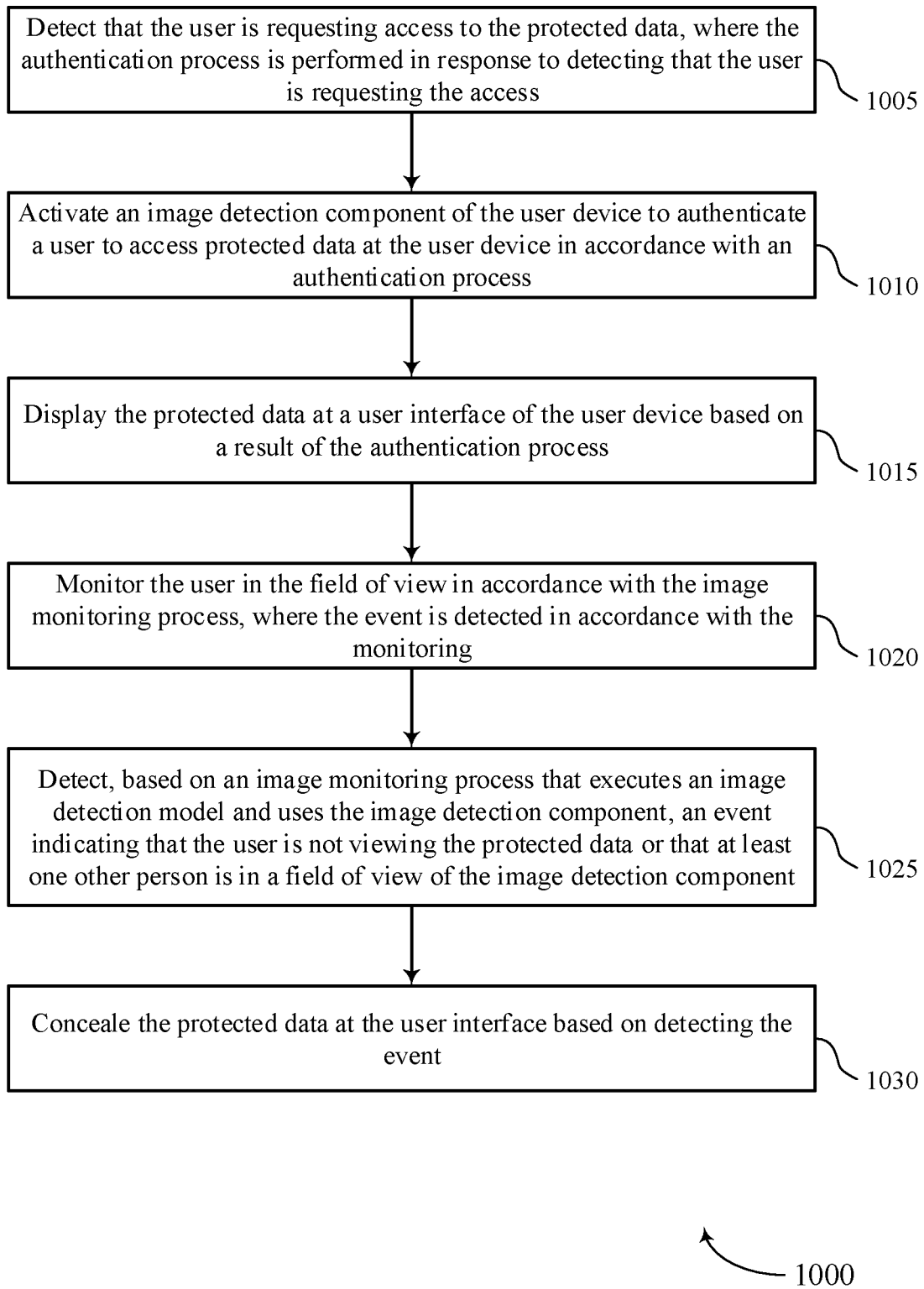

FIG. 10 shows a flowchart illustrating a method 1000 that supports live data viewing security in accordance with aspects of the present disclosure. The operations of method 1000 may be implemented by a user device or its components as described herein. For example, the operations of method 1000 may be performed by a data management component as described with reference to FIGS. 5 through 7. In some examples, a user device may execute a set of instructions to control the functional elements of the user device to perform the functions described below. Additionally or alternatively, a user device may perform aspects of the functions described below using special-purpose hardware.

At 1005, the user device may detect that the user is requesting access to the protected data, where the authentication process is performed in response to detecting that the user is requesting the access. The operations of 1005 may be performed according to the methods described herein. In some examples, aspects of the operations of 1005 may be performed by a data access component as described with reference to FIGS. 5 through 7.

At 1010, the user device may activate an image detection component of the user device to authenticate a user to access protected data at the user device in accordance with an authentication process. The operations of 1010 may be performed according to the methods described herein. In some examples, aspects of the operations of 1010 may be performed by an authentication component as described with reference to FIGS. 5 through 7.

At 1015, the user device may display the protected data at a user interface of the user device based on a result of the authentication process. The operations of 1015 may be performed according to the methods described herein. In some examples, aspects of the operations of 1015 may be performed by a data display component as described with reference to FIGS. 5 through 7.

At 1020, the user device may monitor the user in the field of view in accordance with the image monitoring process, where the event is detected in accordance with the monitoring. The operations of 1020 may be performed according to the methods described herein. In some examples, aspects of the operations of 1020 may be performed by an image monitoring component as described with reference to FIGS. 5 through 7.

At 1025, the user device may detect, based on an image monitoring process that executes an image detection model and uses the image detection component, an event indicating that the user is not viewing the protected data or that at least one other person is in a field of view of the image detection component. The operations of 1025 may be performed according to the methods described herein. In some examples, aspects of the operations of 1025 may be performed by an image monitoring component as described with reference to FIGS. 5 through 7.

At 1030, the user device may conceal the protected data at the user interface based on detecting the event. The operations of 1030 may be performed according to the methods described herein. In some examples, aspects of the operations of 1030 may be performed by a data concealing component as described with reference to FIGS. 5 through 7.

A method of securing data at a user device is described. The method may include activating an image detection component of the user device to authenticate a user to access protected data at the user device in accordance with an authentication process, displaying the protected data at a user interface of the user device based on a result of the authentication process, detecting, based on an image monitoring process that executes an image detection model and uses the image detection component, an event indicating that the user is not viewing the protected data or that at least one other person is in a field of view of the image detection component, and concealing the protected data at the user interface based on detecting the event.

An apparatus for securing data at a user device is described. The apparatus may include a processor, memory coupled with the processor, and instructions stored in the memory. The instructions may be executable by the processor to cause the apparatus to activate an image detection component of the user device to authenticate a user to access protected data at the user device in accordance with an authentication process, display the protected data at a user interface of the user device based on a result of the authentication process, detect, based on an image monitoring process that executes an image detection model and uses the image detection component, an event indicating that the user is not viewing the protected data or that at least one other person is in a field of view of the image detection component, and conceal the protected data at the user interface based on detecting the event.

Another apparatus for securing data at a user device is described. The apparatus may include means for activating an image detection component of the user device to authenticate a user to access protected data at the user device in accordance with an authentication process, displaying the protected data at a user interface of the user device based on a result of the authentication process, detecting, based on an image monitoring process that executes an image detection model and uses the image detection component, an event indicating that the user is not viewing the protected data or that at least one other person is in a field of view of the image detection component, and concealing the protected data at the user interface based on detecting the event.

A non-transitory computer-readable medium storing code for securing data at a user device is described. The code may include instructions executable by a processor to activate an image detection component of the user device to authenticate a user to access protected data at the user device in accordance with an authentication process, display the protected data at a user interface of the user device based on a result of the authentication process, detect, based on an image monitoring process that executes an image detection model and uses the image detection component, an event indicating that the user is not viewing the protected data or that at least one other person is in a field of view of the image detection component, and conceal the protected data at the user interface based on detecting the event.

Some examples of the method, apparatuses, and non-transitory computer-readable medium described herein may further include operations, features, means, or instructions for determining that the user may be an owner of the user device in accordance with the authentication process, where the user may be authenticated to access the protected data based on determining that the user may be the owner of the user device.

In some examples of the method, apparatuses, and non-transitory computer-readable medium described herein, determining that the user may be the owner may include operations, features, means, or instructions for identifying a face in the field of view of the image detection component, and matching the face to an image of the owner of the user device stored in a secure enclave of the user device.

Some examples of the method, apparatuses, and non-transitory computer-readable medium described herein may further include operations, features, means, or instructions for monitoring the user in the field of view in accordance with the image monitoring process, where the event may be detected in accordance with the monitoring.

In some examples of the method, apparatuses, and non-transitory computer-readable medium described herein, monitoring the user may include operations, features, means, or instructions for monitoring one or more facial features that indicate whether the user may be gazing at a display of the user device.

Some examples of the method, apparatuses, and non-transitory computer-readable medium described herein may further include operations, features, means, or instructions for determining that eyes of the user indicate that the user may be looking away from the display of the user device, where the event may be detected in accordance with the determining.

Some examples of the method, apparatuses, and non-transitory computer-readable medium described herein may further include operations, features, means, or instructions for reactivating the authentication process based on detecting the event.

Some examples of the method, apparatuses, and non-transitory computer-readable medium described herein may further include operations, features, means, or instructions for detecting a second event indicating that the user may be viewing the protected data or that the at least one other person may be not in the field of view of the image detection component in accordance with the image monitoring process, and redisplaying the protected data based on detecting the second event.

In some examples of the method, apparatuses, and non-transitory computer-readable medium described herein, concealing the protected data may include operations, features, means, or instructions for blurring the protected data at the user interface, displaying an alert at the user interface, or a combination thereof.

Some examples of the method, apparatuses, and non-transitory computer-readable medium described herein may further include operations, features, means, or instructions for detecting that the user may be requesting access to the protected data, where the authentication process may be performed in response to detecting that the user may be requesting the access.

Some examples of the method, apparatuses, and non-transitory computer-readable medium described herein may further include operations, features, means, or instructions for activating the image monitoring process in response to authenticating the user in accordance with the authentication process.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for securing data at a user device, comprising:
    activating an image detection component of the user device to authenticate a user to access protected data at the user device in accordance with an authentication process;
    determining that the user is an owner of the user device in accordance with the authentication process, wherein the authentication process identifies that the owner is in a field of view of the image detection component, and wherein the user is authenticated to access the protected data based at least in part on determining that the user is the owner of the user device;
    displaying the protected data at a user interface of the user device and activating an image monitoring process based at least in part on a result of the authentication process;
    detecting, based at least in part on the image monitoring process that executes an image detection model and uses the image detection component, an event indicating that the user is not viewing the protected data or that at least one other person is in the field of view of the image detection component, wherein the image monitoring process comprises monitoring a plurality of frames captured in the field of view while the protected data is displayed at the user interface and determining whether a state of the field of view has changed, based at least in part on the monitoring, to detect the event; and
    concealing the protected data at the user interface based at least in part on detecting the event.

2. The method of claim 1, wherein determining that the user is the owner comprises:
    identifying a face in the field of view of the image detection component; and
    matching the face to an image of the owner of the user device stored in a secure enclave of the user device.

3. The method of claim 1, further comprising:
    processing, in accordance with the image monitoring process, the plurality of frames to monitor whether the user is in the field of view, wherein the event is detected in accordance with processing the plurality of frames.

4. The method of claim 3, further comprising:
    monitoring one or more facial features that indicate whether the user is gazing at a display of the user device.

5. The method of claim 4, further comprising:
    determining that eyes of the user indicate that the user is looking away from the display of the user device, wherein the event is detected in accordance with the determining.

6. The method of claim 1, further comprising:
    reactivating the authentication process based at least in part on detecting the event.

7. The method of claim 1, further comprising:
    detecting a second event indicating that the user is viewing the protected data or that the at least one other person is not in the field of view of the image detection component in accordance with the image monitoring process; and
    redisplaying the protected data based at least in part on detecting the second event.

8. The method of claim 1, wherein concealing the protected data comprises:
    blurring the protected data at the user interface, displaying an alert at the user interface, or a combination thereof.

9. The method of claim 1, further comprising:
    detecting that the user is requesting access to the protected data, wherein the authentication process is performed in response to detecting that the user is requesting the access.

10. An apparatus for securing data at a user device, comprising:
    a processor,
    memory coupled with the processor; and
    instructions stored in the memory and executable by the processor to cause the apparatus to:
        activate an image detection component of the user device to authenticate a user to access protected data at the user device in accordance with an authentication process;
        determine that the user is an owner of the user device in accordance with the authentication process, wherein the authentication process identifies that the owner is in a field of view of the image detection component, and wherein the user is authenticated to access the protected data based at least in part on determining that the user is the owner of the user device;
        display the protected data at a user interface of the user device and activate an image monitoring process based at least in part on a result of the authentication process;
        detect, based at least in part on the image monitoring process that executes an image detection model and uses the image detection component, an event indicating that the user is not viewing the protected data or that at least one other person is in the field of view of the image detection component, wherein the image monitoring process comprises monitoring a plurality of frames captured in the field of view while the protected data is displayed at the user interface and determining whether a state of the field of view has changed, based at least in part on the monitoring, to detect the event; and
        conceal the protected data at the user interface based at least in part on detecting the event.

11. The apparatus of claim 10, wherein the instructions to determine that the user is the owner are executable by the processor to cause the apparatus to:
    identify a face in the field of view of the image detection component; and match the face to an image of the owner of the user device stored in a secure enclave of the user device.

12. The apparatus of claim 10, wherein the instructions are further executable by the processor to cause the apparatus to:
process, in accordance with the image monitoring process, the plurality of frames to monitor whether the user is in the field of view, wherein the event is detected in accordance with processing the plurality of frames.

13. The apparatus of claim 12, wherein the instructions are executable by the processor to cause the apparatus to:
monitor one or more facial features that indicate whether the user is gazing at a display of the user device.

14. A non-transitory computer-readable medium storing code for securing data at a user device, the code comprising instructions executable by a processor to:
activate an image detection component of the user device to authenticate a user to access protected data at the user device in accordance with an authentication process;
determine that the user is an owner of the user device in accordance with the authentication process, wherein the authentication process identifies that the owner is in a field of view of the image detection component, and wherein the user is authenticated to access the protected data based at least in part on determining that the user is the owner of the user device;
display the protected data at a user interface of the user device and activate an image monitoring process based at least in part on a result of the authentication process;
detect, based at least in part on the image monitoring process that executes an image detection model and uses the image detection component, an event indicating that the user is not viewing the protected data or that at least one other person is in the field of view of the image detection component, wherein the image monitoring process comprises monitoring a plurality of frames captured in the field of view while the protected data is displayed at the user interface and determining whether a state of the field of view has changed, based at least in part on the monitoring, to detect the event; and
conceal the protected data at the user interface based at least in part on detecting the event.

15. The non-transitory computer-readable medium of claim 14, wherein the instructions to determine that the user is the owner are executable to:
identify a face in the field of view of the image detection component; and
match the face to an image of the owner of the user device stored in a secure enclave of the user device.

16. The non-transitory computer-readable medium of claim 14, wherein the instructions are further executable to:
process, in accordance with the image monitoring process, the plurality of frames to monitor whether the user is in the field of view, wherein the event is detected in accordance with processing the plurality of frames.

* * * * *